United States Patent
Nakao et al.

(10) Patent No.: US 7,430,906 B2
(45) Date of Patent: Oct. 7, 2008

(54) PNEUMATIC TIRE HAVING ACCOMMODATION TOOL OF ELECTRONIC COMPONENT

(75) Inventors: Yukio Nakao, Kobe (JP); Wakahiro Kawai, Kyoto (JP); Masaru Kijima, Tokyo (JP)

(73) Assignees: Sumitomo Rubber Industries, Ltd., Kobe-Shi (JP); Omron Corporation, Kyoto (JP)

( * ) Notice: Subject to any disclaimer, the term of this patent is extended or adjusted under 35 U.S.C. 154(b) by 106 days.

(21) Appl. No.: 11/299,892

(22) Filed: Dec. 13, 2005

(65) Prior Publication Data

US 2006/0123899 A1  Jun. 15, 2006

(30) Foreign Application Priority Data

Dec. 14, 2004  (JP)  ............................. 2004-361735

(51) Int. Cl.
- *G01D 11/24* (2006.01)
- *B60C 23/00* (2006.01)
- *B60C 23/04* (2006.01)
- *G01L 19/14* (2006.01)

(52) U.S. Cl. .................... 73/431; 73/146; 152/152.1; 340/442; 340/572.8

(58) Field of Classification Search ............... 73/146, 73/431, 432.1, 146.8; 152/152.1; 340/442, 340/443, 444, 445, 446, 447, 572.8

See application file for complete search history.

(56) References Cited

U.S. PATENT DOCUMENTS

| | | | | |
|---|---|---|---|---|
| 7,172,130 | B2 * | 2/2007 | Tsunoda et al. | 235/492 |
| 2004/0094251 | A1 * | 5/2004 | Strache et al. | 152/152.1 |
| 2005/0134444 | A1 * | 6/2005 | Park et al. | 340/445 |
| 2005/0221704 | A1 * | 10/2005 | Conwell et al. | 442/149 |
| 2005/0275518 | A1 * | 12/2005 | Adamson et al. | 340/447 |
| 2006/0243043 | A1 * | 11/2006 | Breed | 73/146 |

FOREIGN PATENT DOCUMENTS

| | | |
|---|---|---|
| JP | 2-123404 A | 5/1990 |
| JP | 2001-30369 A | 2/2001 |
| JP | 2002-137609 A | 5/2002 |

\* cited by examiner

*Primary Examiner*—Edward Lefkowitz
*Assistant Examiner*—Punam Patel
(74) *Attorney, Agent, or Firm*—Birch, Stewart, Kolasch & Birch, LLP (57) ABSTRACT

A pneumatic tire (1) has a tire cavity surface (HS) to which an accommodation tool (11) for accommodating an electronic component is bonded. The accommodation tool (11) includes an accommodation space (10) for accommodating an electronic component (W) therein, and includes a bonding region (11Sb) which is bonded to the tire cavity surface (HS) and which is provided on one end of a back surface (11S) directed to the tire cavity surface (HS). Only the bonding region (11Sb) is bonded to the tire cavity surface (HS), thereby making it possible to separate a portion of a non-bonding region (11Sa) on the side of the other end of the back surface (11S) from the tire cavity surface (HS).

13 Claims, 9 Drawing Sheets

PNEUMATIC TIRE HAVING ACCOMMODATION TOOL OF ELECTRONIC COMPONENT

BACKGROUND OF THE INVENTION

1. Field of the Invention

The present invention relates to a pneumatic tire having an accommodation tool of an electronic component such as a Radio Frequency Identification (RFID) transponder for example.

2. Description of the Related Art

In recent years, in order to monitor various data such as an internal pressure, a temperature, and the number of revolutions of a tire, and in order to enhance safety and maintenance performance, a technique of mounting an electronic component such as an RFID transponder that records the various data has been proposed. The transponder is a small and lightweighted electronic component provided with a semiconductor, in which a transmit/receive circuit, a control circuit, a memory, and the like are formed into a chip, and an antenna. Commonly used transponders work without battery, capable of, when inquiry radio waves are received, transmitting various data in the memory as response radio waves using the received radio wave as electric power.

One example of a method for mounting such an electronic component on a tire is, as disclosed in Japanese Laid-open Utility Model Applications No. H2-123404 and No. H2-123404, and the like, is such that the electronic component is embedded in a raw (non-vulcanized) tire to be integrally formed with the tire by vulcanizing adhesion during vulcanization formation. As another example, Japanese Laid-open Utility Model Application No. H2-123404 discloses a method in which the electronic component is adhered to a surface of the tire after the vulcanization.

SUMMARY OF THE INVENTION

However, in any of the cases, since the electronic component and the tire are integrally fixed to each other, deformation and impact of the tire when a vehicle runs, and heat of the tire are strongly transmitted to the electronic component. Thus, there is a problem that the electronic component is damaged, and performance of the tire is deteriorated and trouble is generated. It is conceived that the electronic component is mounted on a bead portion which has a relatively small deformation amount, but this method is not sufficient, since deformation of certain level is generated.

Based on an idea that an accommodation tool of an electronic component is bonded to a tire cavity surface only on the side of one end of the accommodation tool, it is an object of the present invention to provide a pneumatic tire capable of preventing deformation, impact and heat of the tire from being transmitted to the electronic component, and capable of effectively preventing deterioration of performance and trouble of the electronic component.

To achieve the above object, the present invention provides a pneumatic tire having a tire cavity surface to which an accommodation tool for accommodating an electronic component is bonded, wherein the accommodation tool includes an accommodation space for accommodating an electronic component therein, and includes a bonding region which is bonded to the tire cavity surface and which is provided on one end of a back surface directed to the tire cavity surface, only the bonding region is bonded to the tire cavity surface, thereby making it possible to separate a portion of a non-bonding region on the side of the other end of the back surface from the tire cavity surface.

Since the present invention has the above-described structure, the other end of the accommodation tool can freely be separated from the tire cavity surface. Thus, it is possible to effectively prevent the deformation, impact and heat of the tire during running from being transmitted to the electronic component, and to effectively prevent the deterioration and trouble of the electronic component. Even if the electronic component is relatively large in size, the above merit can effectively be exhibited without adversely affecting the tire, and flexibility of selection of the electronic component can largely be enhanced.

DETAILED DESCRIPTION OF THE PREFERRED EMBODIMENTS

Figure 1:
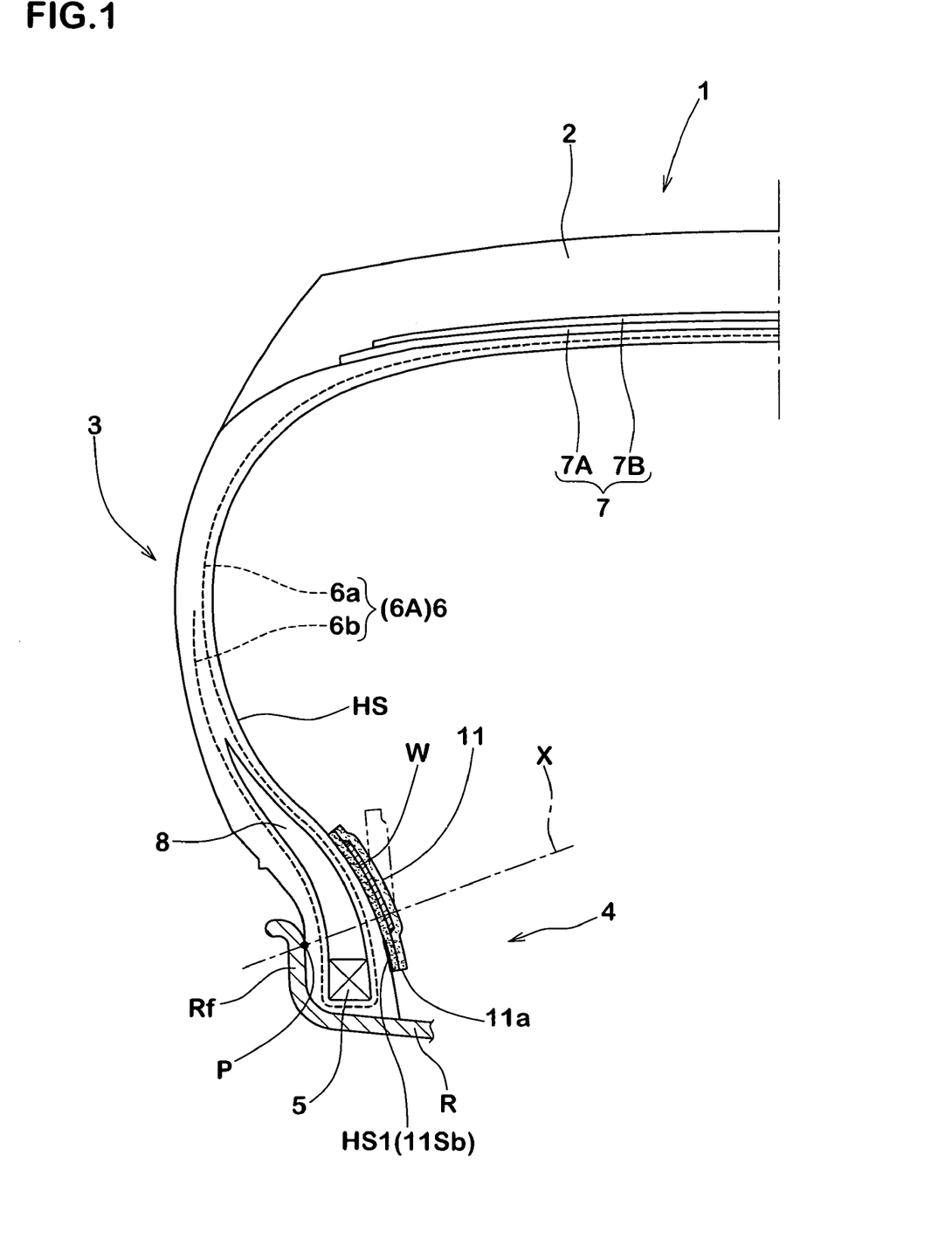
FIG. 1 is a sectional view showing an embodiment of a pneumatic tire of the present invention.
Figure 2:
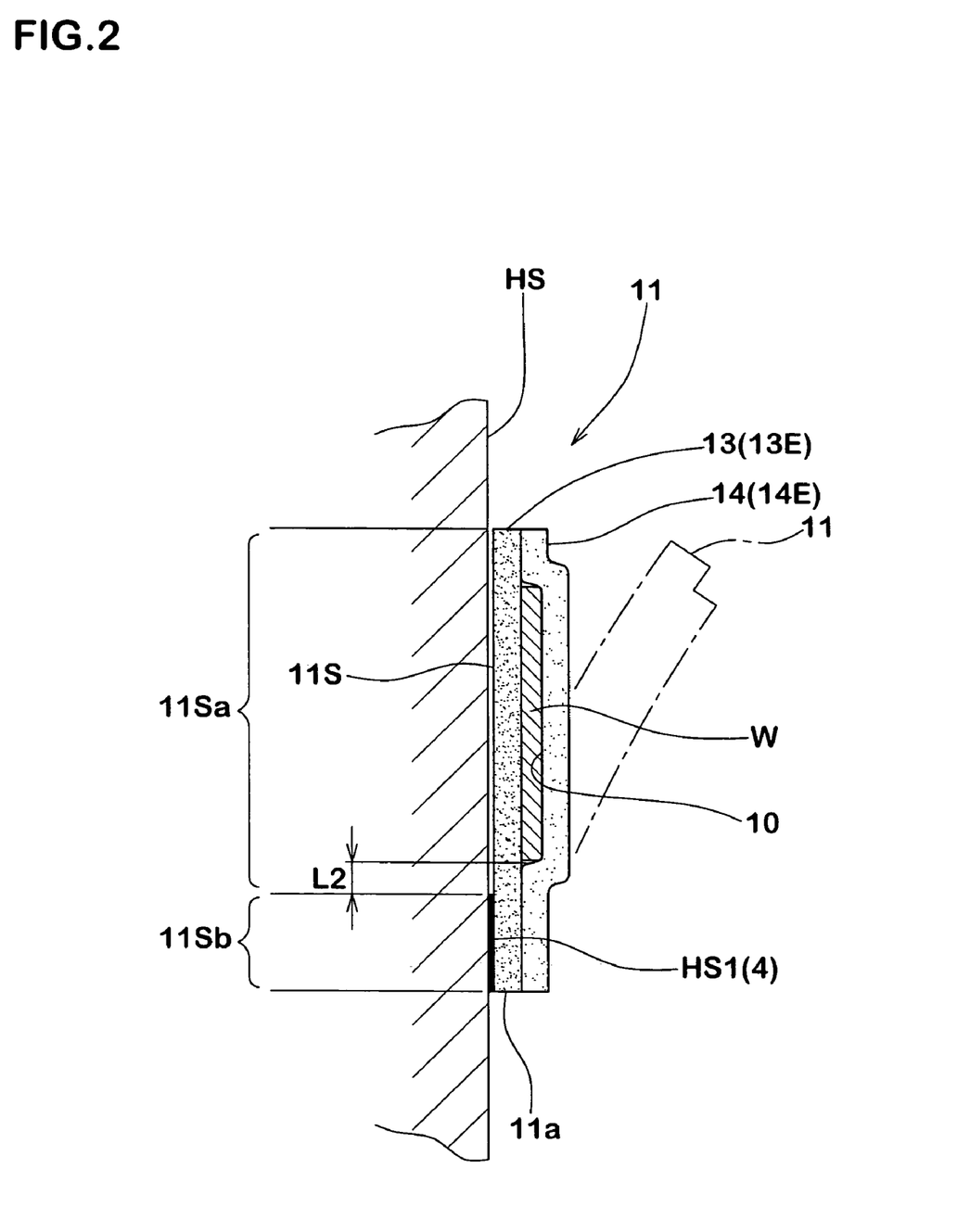
FIG. 2 is an enlarged sectional view showing an accommodation tool and a bead portion of a first embodiment.
Figure 3:
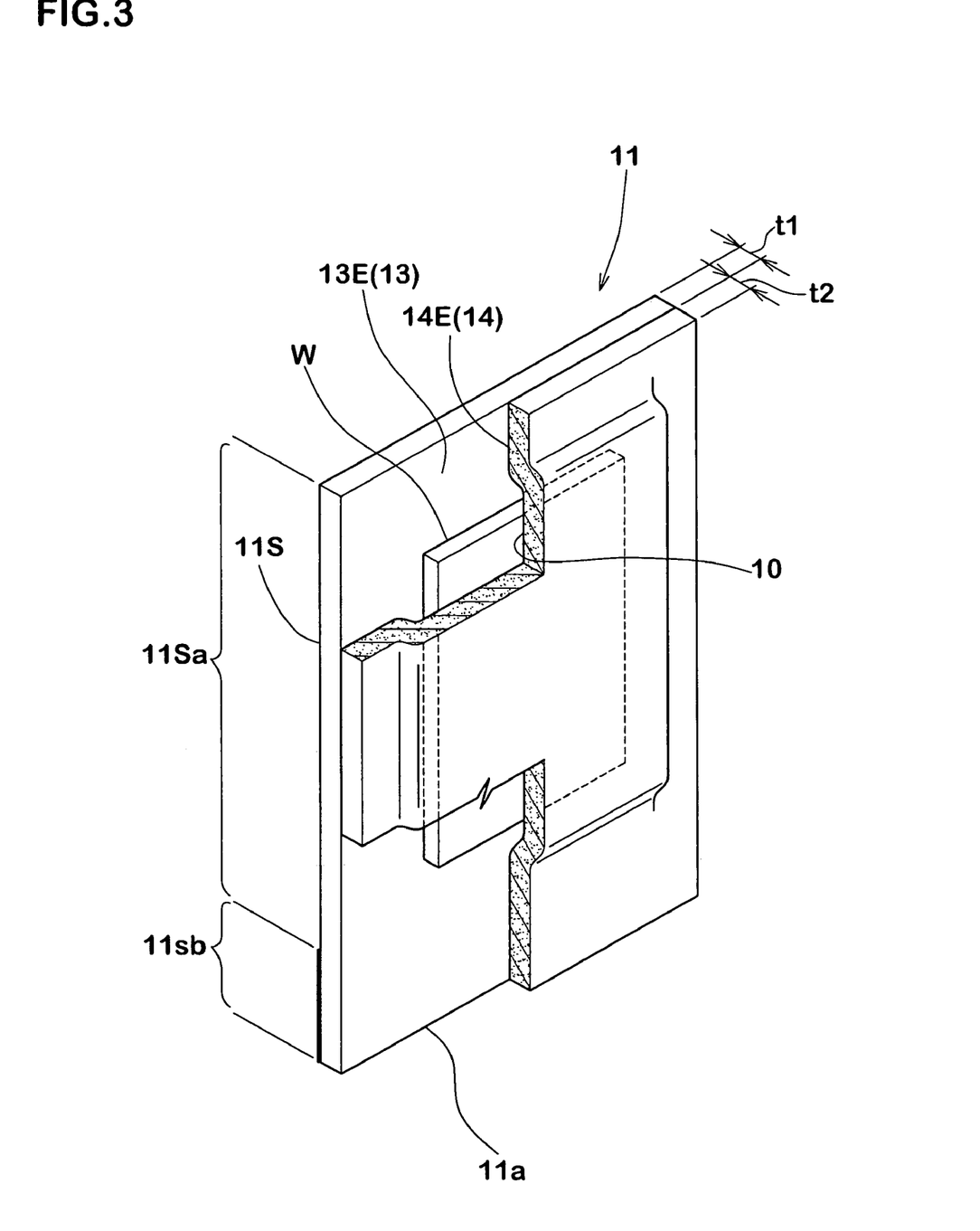
FIG. 3 is a perspective view showing the accommodation tool.

Embodiments of the present invention will be explained together with illustrated examples. FIG. 1 is a meridian sectional view showing a pneumatic tire having an accommodation tool of an electronic component of the present invention. FIG. 2 is an enlarged sectional view showing an accommodation tool and a bead portion of a first embodiment. FIG. 3 is a perspective view showing the accommodation tool.

As shown in FIG. 1, a pneumatic tire 1 (simply referred to as the "tire 1" in some cases) provided with an accommodation tool of an electronic component includes a tread portion 2 which comes into contact with a road surface, a pair of sidewall portions 3 extending from opposite ends of the tread portion 2 radially inward, and a bead portion 4 which is located radially inner end of each sidewall portions 3 and which is fitted over the rim R. In this example, the tire 1 is a radial tire for a passenger vehicle.

The tire 1 is reinforced by a cord reinforcing layer, and necessary rigidity and strength are secured. The cord reinforcing layer includes at least a toroidal carcass 6 extending from a tread portion 2 to a bead core 5 of a bead portion 4 through a sidewall portion 3. In this example, the cord reinforcing layer includes the carcass 6 and a belt layer 7 existing radially outward of the carcass 6 and inside of the tread portion 2.

The carcass 6 is formed of one or more (one, in this example) carcass ply 6A in which carcass cords are arranged at an angle of 70° to 90° with respect to the circumferential direction of the tire. The carcass ply 6A is continuously provided with a turnup portion 6b which is folded back and retained around the bead core 5 from inside to outside in the axial direction of the tire at opposite sides of a ply main body 6a extending between the bead cores 5 and 5. A bead apex rubber 8 is disposed between the ply main body 6a and the turnup portion 6b. The bead apex rubber 8 extends radially outward from the bead core 5 to reinforce the tire from the bead portion 4 to the sidewall portions 3, and has a triangular cross section.

The belt layer 7 includes two or more (two, in this example) belt plies 7A and 7B in which belt cords are arranged at an angle of 10 to 35° with respect to the circumferential direction of the tire. The belt cords intersect with each other between the plies. With this, the belt rigidity is enhanced, and the tread portion 2 is strongly reinforced over its substantially entire width with hoop effect. A band layer (not shown) in which band cords are arranged at an angle of 5° with respect to the circumferential direction of the tire may be provided radially outward of the belt layer 7 to enhance the steering stability and durability at the time of high speed running.

The tire 1 has a tire cavity surface HS made of known low air-permeable rubber such as butyl-based rubber for example. With this, the tire cavity is air-tightly held. An accommodation tool 11 provided therein with an accommodation space 10 for accommodating an electronic component W is mounted on the tire cavity surface HS.

In this example, as shown in FIGS. 2 and 3, the electronic component W is sealed in the accommodation space 10 of the accommodation tool 11. More specifically, the accommodation tool 11 includes a back sheet 13 on the side of the tire cavity surface HS, and a front sheet 14 superposed on the back sheet 13. The back sheet 13 and the front sheet 14 have peripheral edges 13E and 14E, respectively, and the entire peripheral edges 13E and 14E are bonded to each other, thereby forming the accommodation space 10 in which the electronic component W is sealed. The back sheet 13 and front sheet 14 are made of thin rubber sheets having thicknesses t1 and t2 of 2.0 mm or less. In this example, the back sheet 13 and front sheet 14 have tetragonal shape having substantially the same widths and substantially the same lengths.

Figure 4:
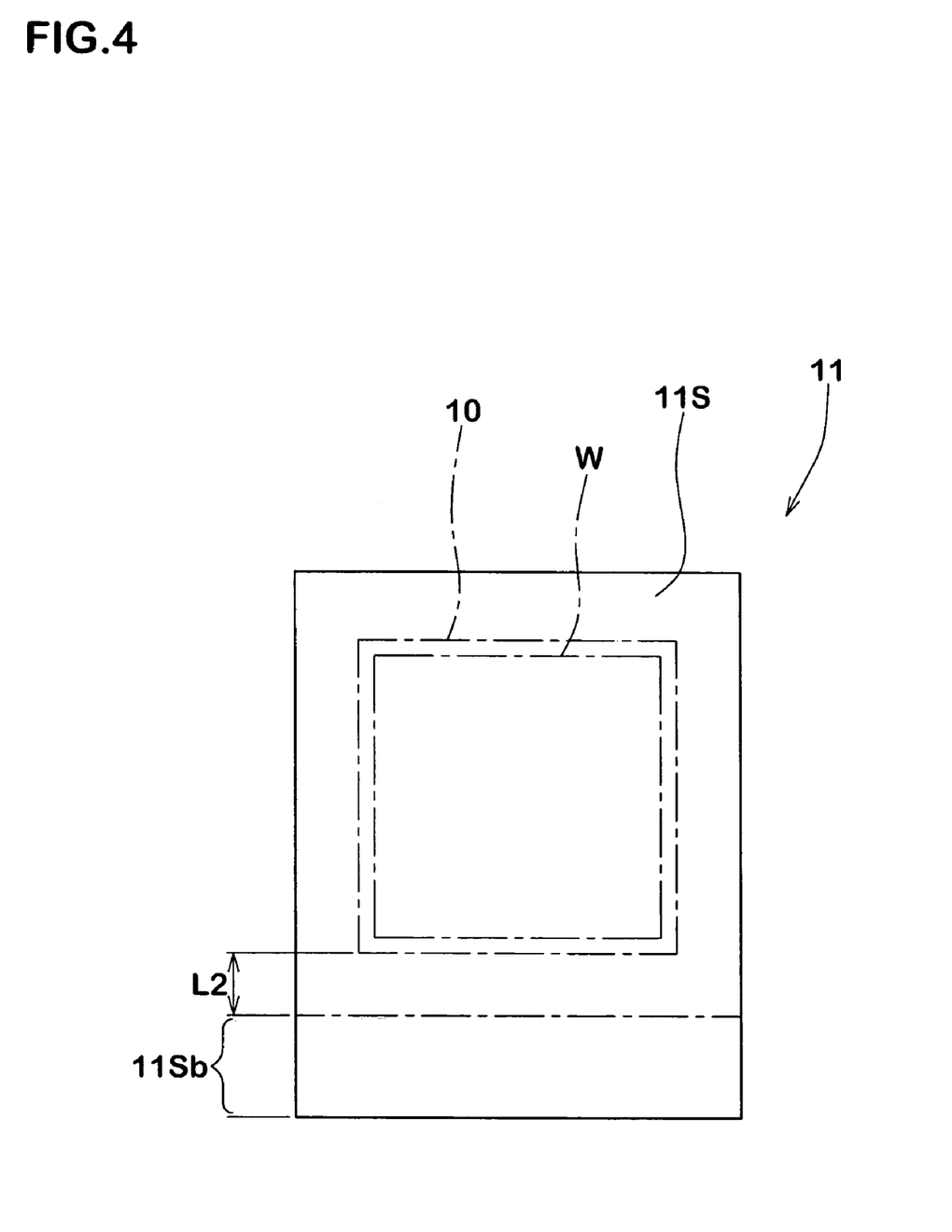
FIG. 4 is a rear view showing a back surface of a back sheet.

In this invention, one end of a back surface 11S of the accommodation tool 11 is provided with a bonding region 11Sb which is bonded to the tire cavity surface HS, and only the bonding region 11Sb is bonded to the tire cavity surface HS. With this structure, a portion of the non-bonding region 11Sa on the other end side is free and can be separated from the tire cavity surface HS. The accommodation space 10 is formed in a portion of the non-bonding region 11Sa. Therefore, deformation, impact and heat of the tire during running can be restrained from being transmitted to the electronic component by freely separating the non-bonding region 11Sa from the tire cavity surface HS. As a result, the electronic component W is prevented from being damaged and it is possible to prevent the deterioration of performance and trouble of the electronic component W. Thus, it is preferable that the bonding region 11Sb is separated from the accommodation space 10 by at least 1.0 mm distance L2 (shown in FIG. 4).

The bonding region 11Sb is bonded to a mounting portion HS1 in the tire cavity surface HS. The bead portion 4 is suitable as the mounting portion HS1. This is because that the bead portion 4 is a portion where deformation during running of the tire is the smallest and with this, the adverse influence such as impact applied to the electronic component W can be reduced. This is also preferable for suppressing peeling damage of the accommodation tool 11.

As shown in FIG. 1, the bead portion 4 means a region radially inward of a reference line X which intersects with the play main body 6a of the carcass 6 from a separating point P at which the bead portion 4 is separated from a rim flange Rf. The "normal rim" is a rim determined for each tire by a standard including one on which the tire is based, and the normal rim is a standard rim in the case of JATMA, a "Design Rim" in the case of TRA, and a "Measuring Rim" in the case of ETRTO. Further, "normal internal pressure" means an air pressure determined for each tire by a standard. The "normal internal pressure" is a maximum air pressure in JATMA, a maximum value described in "TIRE LOAD LIMITS AT VARIOUS COLD INFLATION PRESSURES" in the case of TRA, and "INFLATION PRESSURE" in the case of ETRTO. When the tire is for a passenger vehicle, the normal internal pressure is 180 kPa.

In the accommodation tool 11, the portion of the non-bonding region 11Sa may extend toward the sidewall portions 3 beyond the reference line X only if only the bonding region 11Sb is mounted on the bead portion 4. In this case also, the adverse influence on the electronic component W caused by impact or the like can be reduced to small level. In this example, one side 11a of the four sides forming a periphery of the accommodation tool 11 faces the tire rotation center line and the bonding region 11Sb is formed on the side of this side 11a. In other words, the bonding region 11Sb is formed on the side of this side 11a at which the accommodation tool 11 faces the tire rotation center line, i.e., on the side of the side 11a at which the accommodation tool 11 faces radially inward of the tire. In this case, a large electronic component W exceeding the reference line X can be mounted, and flexibility of selection of the electronic component W is largely enhanced. Further, in this case, since the centrifugal force during rotation of the tire is applied in a direction pulling the accommodation tool 11 radially outward, bending fatigue at the boundary position between the bonding region 11Sb and the non-bonding region 11Sa can be reduced, and the durability of the accommodation tool 11 can be enhanced.

Figure 5:
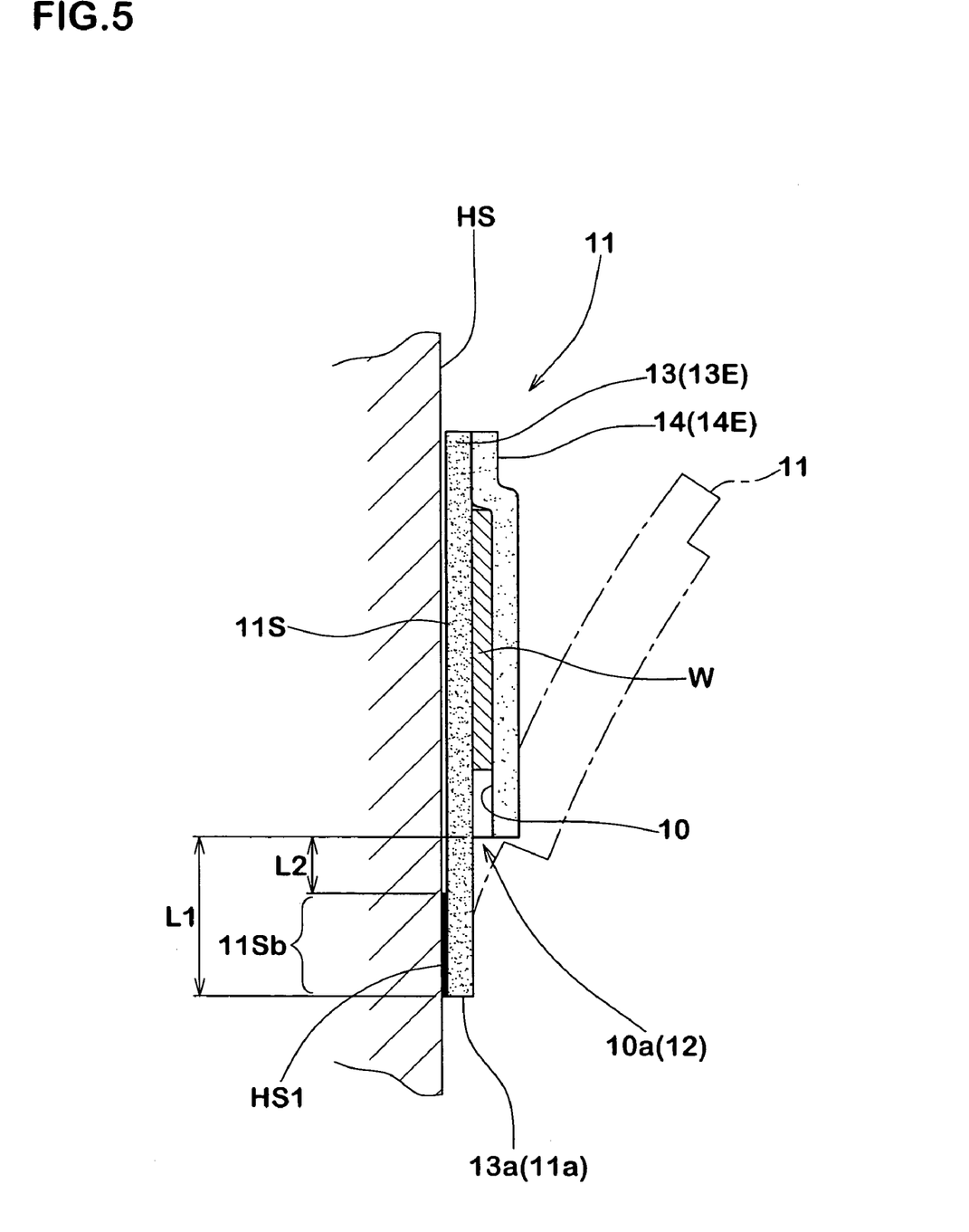
FIG. 5 is an enlarged sectional view showing an accommodation tool and a bead portion of a second embodiment.
Figure 6:
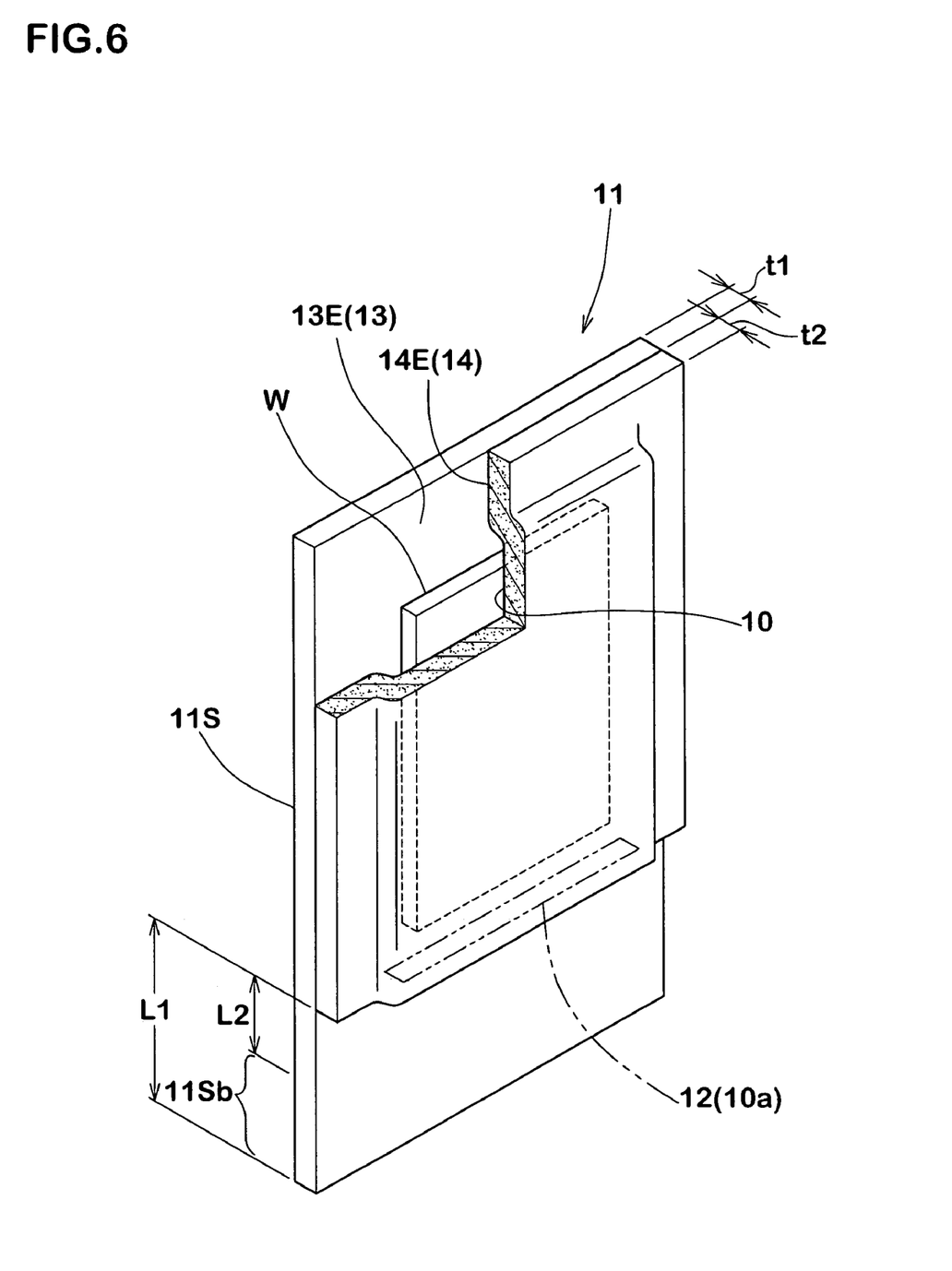
FIG. 6 is a perspective view showing the accommodation tool.

As shown in FIGS. 5 and 6, the accommodation tool 11 may be formed into a bag-like shape in which one end 10a of the accommodation space 10 is provided with an opening 12 for accommodating an electronic component. For the sake of convenience, a case in which the electronic component W is sealed by the accommodation tool 11 is called a first embodiment, and a case in which the accommodation tool 11 is formed into the bag-like shape having the opening 12 is called a second embodiment.

The second embodiment is formed by bonding the peripheral edges 13E and 14E of the back sheet 13 and the front sheet 14 to each other, but there is an unbonded portion among the sides forming the periphery of the accommodation tool 11. Particularly in this example, the back sheet 13 and the front sheet 14 are formed into the tetragonal shapes having substantially the same widths, and three sides of the peripheral edge 13E and three sides of the peripheral edge 14E are bonded to each other except other one sides among four sides forming the periphery of the accommodation tool 11. At that time, it is preferable that the back sheet 13 is longer than the front sheet 14, and the opening 12 is formed at a location of an end edge 13a on the side of the one side of the back sheet 13 inward by a distance L1 of 3.0 mm or more. With this structure, the electronic component W can be brought into and out from the accommodation space 10 easily, and the electronic component W can be exchanged in the event of trouble of the electronic component W. The accommodation tool 11 is formed such that the entire electronic component W is completely accommodated in the accommodation space 10 so that the electronic component W does not jump out from the opening 12 during running.

In the second embodiment also, it is preferable that the bonding region 11Sb is formed on the side of the side 11a where the accommodation tool 11 faces the tire rotation center line due to the same reason as that of the first embodiment. At that time, it is further preferable that the opening 12 is opened toward the tire rotation center line. With this structure, it is possible to further prevent the electronic component W from jumping out from the opening 12 due to the centrifugal force during running. In order to further prevent the electronic component W from jumping out from the opening 12, it is preferable that the opening 12 closed using adhesive such as acrylic adhesive, rubber adhesive and silicone adhesive.

In the present invention, the bonding region 11Sb of the accommodation tool 11 and the tire cavity surface HS can be bonded to each other using existing various adhesives including the above-described adhesive. However, in order to secure higher bonding strength, it is preferable that both of them are integrally bonded by vulcanization (vulcanization adhesive) at the time of vulcanization formation of the tire.

Figure 7A:
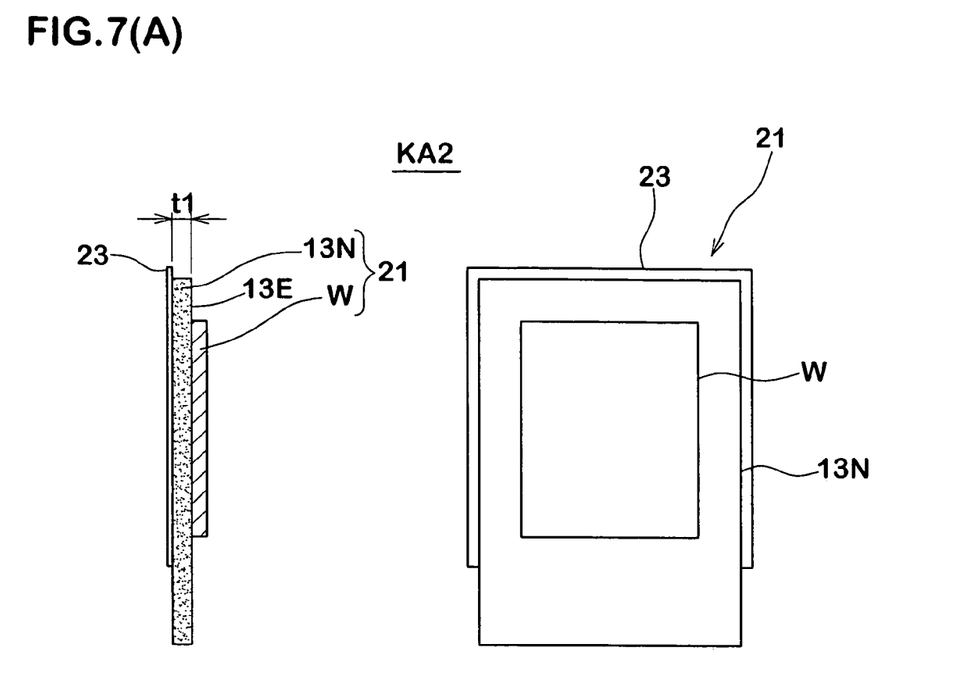
FIG. 7(A) is a diagram showing a step of forming a superposed body in the accommodation tool of the first embodiment.
Figure 7B:
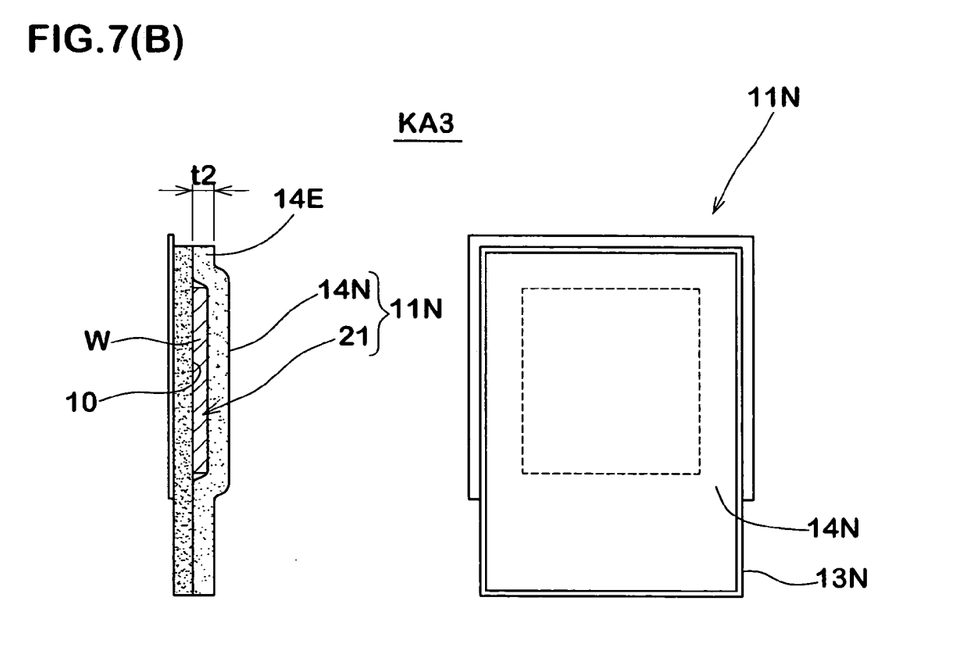
FIG. 7(B) is a diagram showing a step of loading a front sheet on the superposed body in the accommodation tool of the first embodiment.
Figure 8:
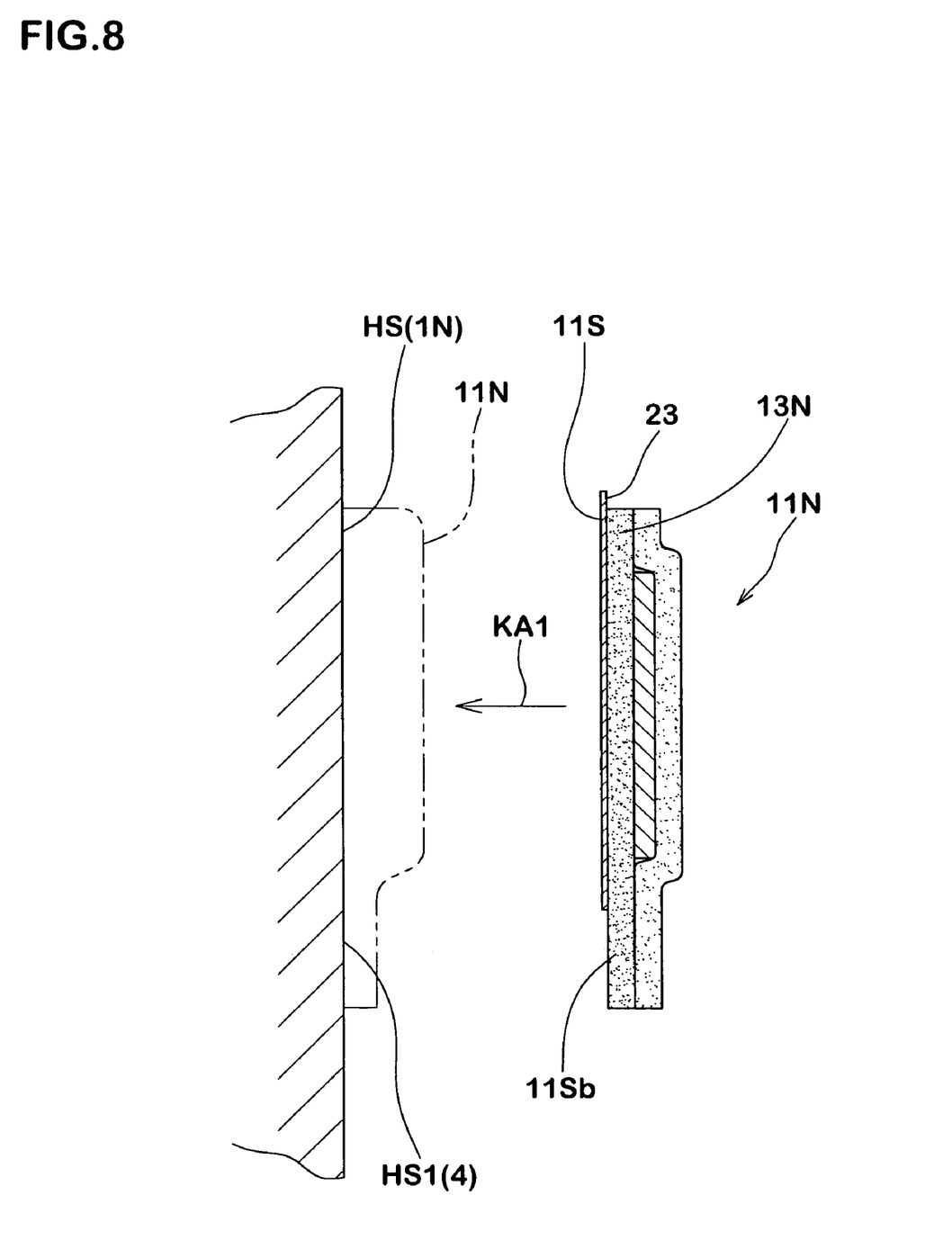
FIG. 8 is a diagram showing a step of disposing a back sheet on a raw tire.

Next, a producing method of the pneumatic tire 1 according to the first embodiment in which the bonding region 11Sb and the tire cavity surface HS are bonded by vulcanization will be explained. More specifically, the first embodiment includes at least (1) a step KA1 of disposing a raw back sheet 13N on the tire cavity surface HS of the raw tire 1N and the bead portion 4 (FIG. 8);

(2) a step KA2 of disposing the electronic component W on the raw back sheet 13N to form a superposed body 21 (FIG. 7(A)); and (3) a step KA3 of disposing a raw back sheet 14N on the superposed body 21 to cover the electronic component W (FIG. 7(B)).

In this embodiment, the steps KA2 and KA3 are carried out first to previously form a raw accommodation tool 11N and then instep KA1, the raw back sheet 13N is disposed on the tire cavity surface HS in the state of the raw accommodation tool 11N.

The back sheet 13N is formed into a tetragonal shape made of raw rubber sheet material having thickness t1 of 2.0 mm or less, and the back sheet 13N has the peripheral edge 13E which extends beyond the electronic component W. In step KA2, the electronic component W is placed on the back sheet 13N such that the peripheral edge 13E is left around the electronic component W. In this example, there is used an electronic component W of tetragonal shape of 20 mm (width)×30 mm (length)×0.3 mm (thickness).

In step KA3, a raw front sheet 14N made of raw rubber sheet material having thickness t2 of 2.0 mm or less is disposed on the superposed body 21. At that time, the entire peripheral edge 14E of the front sheet 14N and the entire peripheral edge 13E of the back sheet 13N are superposed on and adhered to each other, and the raw accommodation tool 11N having the accommodation space 10 in which the electronic component W is sealed can easily be formed.

Next, in step KA1, as shown in FIG. 8, the back sheet 13N is disposed on and adhered to the tire cavity surface HS of the raw tire 1N and the bead portion 4 in the state of the raw accommodation tool 1N. At that time, a peeling sheet 23 which is a non-adhering layer is previously pasted on the back surface 11S and the non-bonding region 11Sa such that the non-bonding region 11Sa is not vulcanized adhered to the tire cavity surface HS. The peeling sheet 23 is pasted such that all regions thereof except the bonding region 11Sb extend beyond the back surface 11S. A preferable peeling sheet 23 is a sheet obtained by subjecting a surface of a sheet body made of resin to a peeling processing, and resin material is not melted by heat of 180° C. such as polyethylene terephtalate (PET), polyethylene naphthalate (PEN), polyether imide (PEI), polyphenyether (PPS), polyimide (PI) and polyether ether ketone (PEEK). As the peeling processing, it is possible to employ processing for coating the sheet body with mold release resin such as poly fluor ethylene-based resin and silicone-based resin having mold release properties with respect to rubber. Alternatively, it is possible to employ processing for applying liquid mold release agent including silicone oil or the like to the surface. Alternatively, the peeling sheet 23 itself may be formed of only the mold release resin. In this example, the peeling sheet 23 is adhered to the back surface 11S of the accommodation tool 11 even after the vulcanization step. However, the mold release properties with respect to rubber on the side of the tire may be eliminated so that the peeling sheet 23 is released from the back surface 11S and adhered to the tire cavity surface HS after the vulcanization step.

In the producing method, the steps may be carried out in the order of KA1→KA2 (or KB2)→KA3 (OR KB3), i.e., the back sheet 13N may first be adhered to the tire cavity surface HS of the raw tire 1N and the electronic component W and the front sheet 14N may be sequentially provided on the back sheet 13N.

Then, the raw tire 1N is put into a vulcanization mold like the conventional tire and the tire is vulcanized and formed. At that time, since bladders are expanded, the raw accommodation tool 11N is brought into contact with the raw tire 1N under pressure, and both of them can vulcanized and adhered and integrally bonded to each other.

If the raw accommodation tool 11N is too thick, the pressure caused by the bladders is concentrated, and the tire 1 and the accommodation tool 11 are deformed. Therefore, it is preferable that the thickness t1 and t2 of the back sheet 13N and the front sheet 14N are set 2.0 mm or less so that the pressure caused by the bladders is dispersed. If the thickness t1 and t2 are less than 0.4 mm, however, the thicknesses are too thin and it is difficult to secure strength for withstanding rotation of the tire. To secure the strength, it is possible to embed a body in which cords are arranged or a cloth reinforcing material such as canvas to reinforce the sheet. As the back sheet 13N and the front sheet 14N, it is possible to employ various rubbers which can be vulcanized and adhered to the inner liner rubber such as natural rubber (NR), polyisoprene rubber (IR), styrene butadiene rubber (SBR), butadiene rubber (BR) and butyl rubber (IIR)

Figure 9:
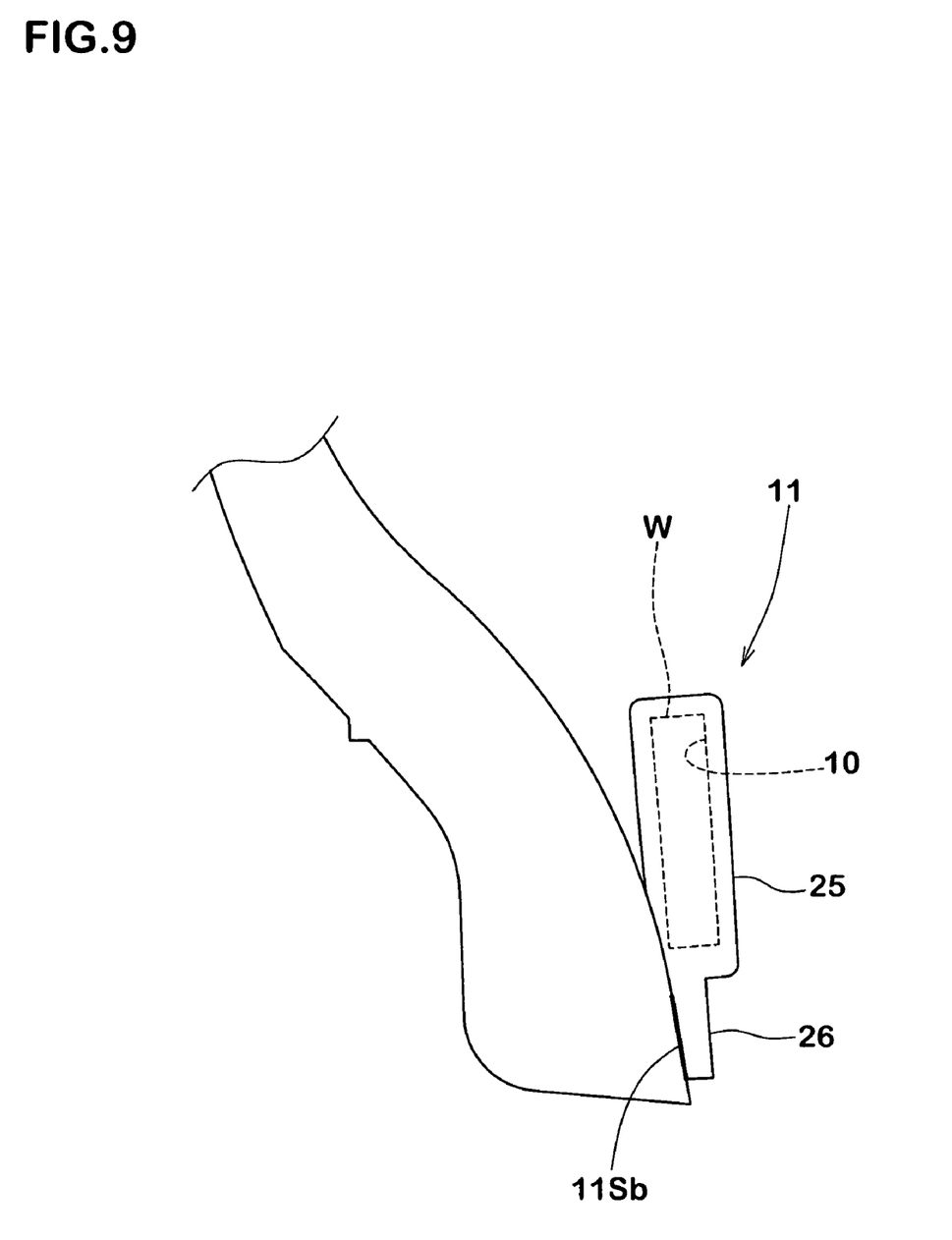
FIG. 9 is a sectional view showing another example of the accommodation tool together with the bead portion.

Although the especially preferred embodiments have been described in detail above, the invention is not limited to the illustrated embodiments, and the tires 1 can be formed as tires in various categories such as a dealer vehicle tire, a heavy load vehicle tire and a two-wheel vehicle tire in addition to a passenger vehicle tire. The accommodation space 10 can employ various shapes in accordance with the electronic component W in addition to the tetragonal shape. The accommodation tool 11N may be formed into a non-sheet shape as shown in FIG. 9, instead of being sandwiched between the back sheet 13 and the front sheet 14. In this case, the accommodation tool 11 is integrally provided with a thick rubber massive main portion 25 in which the electronic component W is accommodated, and a tongue piece-like bonding portion 26 having the bonding region 11Sb which is to be bonded to the tire. The present invention can variously be modified and carried out, and for example, the accommodation space 10 may be used for accommodating various electronic components W such as a pressure sensor, a temperature sensor and an acceleration sensor other than the RFID transponder.

EXAMPLE

In accordance with the producing method of the first embodiment, a pneumatic tire (195/65R15) having the accommodation tool 11 of the structure shown in FIGS. 2 and 3 was prototyped based the specification shown in Table 1. A reception confirming test in a running state in an electronic component W (RFID transponder) accommodated in the accommodation tool 11 was carried out. The electronic component is an electromagnetic induction type RFID tag (V720S) produced by Omron Co., Ltd., and communication frequency is 13.56 MHz.

(1) Reception Confirmation Test:

The prototyped tire in which the electronic component is inserted into the accommodation tool was allowed to run on a drum at speed (80 km/h) for 60 hours under conditions of rim (15×6 JJ), internal pressure (190 kPa) and vertical load (6.96 kN), and reception performance of the electronic component after running was confirmed by a reader (HS03 produced by Omron Co., Ltd.). A data reading distance to the electronic component was 130 mm, a data writing distance was 130 mm, and it was confirmed that memory function was normally operated without loss of data.

TABLE 1

| Raw back sheet | |
|---|---|
| Material | SBR |
| Size | 52 mm (width) × 42 mm (length) × 0.7 mm (thickness) |
| Size of electronic component | 20 mm (width) × 30 mm (length) × 0.3 mm (thickness) |
| Raw front sheet | |
| Material | SBR |
| Size | 50 mm (width) × 40 mm (length) × 0.7 mm (thickness) |
| Peeling sheet | |
| Size | 42 mm (width) × 45 mm (length) × 0.075 mm (thickness) |
| Mode release processing | Coating with Teflon (trademark of DuPont) |
| Mounting portion | Bead portion |
| Bonding region | On a side facing the rotation center line 12 mm (width) × 42 mm (length) |
| Accommodation space | Electronic component is sealed. |

What is claimed is:

1. A pneumatic tire having a tire cavity surface to which an accommodation tool for accommodating an electronic component is bonded, wherein
   the accommodation tool has an accommodation space for accommodating an electronic component therein, and comprises (1) a bonding region portion located in a bonding region which is bonded to the tire cavity surface and which is provided on one end portion of a back surface directed to the tire cavity surface and (2) a non-bonding region portion located in a non-bonding region on the other end of the back surface,
   the accommodation tool is formed into a bag-like shape having an opening through which the electronic component is brought into and out from the accommodation space,
   the accommodation space is formed in the non-bonding region portion, and
   only the bonding region is bonded to the tire cavity surface, thereby making it possible to separate the non-bonding region portion from the tire cavity surface.

2. The pneumatic tire having the accommodation tool for accommodating the electronic component according to claim 1, wherein the bonding region of the accommodation tool is bonded to a bead portion.

3. The pneumatic tire having the accommodation tool for accommodating the electronic component according to claim 1, wherein the bonding region is disposed radially inward of the tire.

4. The pneumatic tire having the accommodation tool for accommodating the electronic component according to claim 1, wherein the opening is opened such as to face the tire rotation center line.

5. The pneumatic tire having the accommodation tool for accommodating the electronic component according to claim 1, wherein the accommodation tool comprises a rubber back sheet directed to the tire cavity surface, and a rubber front sheet superposed on the back sheet, a peripheral edge of the back sheet and a peripheral edge of the front sheet are bonded to each other, thereby forming the accommodation space.

6. The pneumatic tire having the accommodation tool for accommodating the electronic component according to claim 1, wherein the back surface of the accommodation tool or the tire cavity surface is provided with a non-adhering layer for forming the non-bonding region.

7. The pneumatic tire having the accommodation tool for accommodating the electronic component according to claim 1, wherein
   the accommodation tool is made from a rubber back sheet located on the tire cavity surface side and a front sheet confronting the back sheet, and
   the accommodation space for accommodating an electronic component is provided between the front and back sheets.

8. A pneumatic tire having a tire cavity surface to which an accommodation tool for accommodating an electronic component is bonded, wherein
   the accommodation tool is made from a rubber back sheet located on the tire cavity surface side and a rubber front sheet and has an accommodation space for accommodating an electronic component between the back and front sheets,
   the accommodation tool comprises (1) a bonding region portion located in a bonding region which is bonded to the tire cavity surface and which is provided on one end portion of a back surface directed to the tire cavity surface and (2) a non-bonding region portion located in a non-bonding region on the other end of the back surface,
   the accommodation tool is formed into a bag-like shape having an opening through which the electronic component is brought into and out from the accommodation space, and
   only the bonding region is bonded to the tire cavity surface, whereby the non-bonding region portion is separated from the tire cavity surface.

9. The pneumatic tire of claim 8, wherein the bonding region of the accommodation tool is bonded to a bead portion.

10. The pneumatic tire of claim 8, wherein the bonding region is disposed radially inward of the tire.

11. The pneumatic tire of claim 8, wherein the opening is opened so as to face the tire rotation center line.

12. The pneumatic tire of claim 8, wherein a peripheral edge of the back sheet and a peripheral edge of the front sheet are bonded to each other, thereby forming the accommodation space.

13. The pneumatic tire of claim 8, wherein the back surface of the accommodation tool or the tire cavity surface is provided with a non-adhering layer for forming the non-bonding region.

* * * * *